United States Patent [19]

Harris

[11] Patent Number: 4,899,526
[45] Date of Patent: Feb. 13, 1990

[54] MOWER DECK CONSTRUCTION AND METHOD FOR MAKING SAME

[75] Inventor: Jack E. Harris, Savannah, Ga.

[73] Assignee: Savannah Plastics, Inc., Savannah, Ga.

[21] Appl. No.: 229,845

[22] Filed: Aug. 8, 1988

[51] Int. Cl.⁴ .......................................... A01D 67/00
[52] U.S. Cl. ................................ 56/320.2; 56/17.5; 264/46.6
[58] Field of Search ................... 56/320.1, 320.2, 16.7, 56/17.5; 264/46.6; 428/137, 159, 160

[56] References Cited

U.S. PATENT DOCUMENTS

| | | | |
|---|---|---|---|
| 3,379,800 | 4/1968 | Wert | 264/46.6 X |
| 3,646,739 | 3/1972 | Dahl | 56/320.1 |
| 3,772,111 | 11/1973 | Ginsburg | 264/46.6 X |
| 3,807,151 | 4/1974 | Rosenthal et al. | 56/320.1 X |
| 4,064,680 | 12/1977 | Fleigle | 56/320.2 X |
| 4,189,903 | 2/1980 | Jackson et al. | 56/17.5 X |
| 4,194,345 | 3/1980 | Pioch et al. | 56/17.5 |
| 4,204,388 | 5/1980 | Dawson | 56/320.1 |
| 4,244,164 | 1/1981 | Szymanis | 56/320.2 X |
| 4,245,456 | 1/1981 | Zipfel | 56/320.1 X |
| 4,263,759 | 4/1981 | Miller | 264/46.6 X |
| 4,282,704 | 8/1981 | Stevens | 56/320.1 |
| 4,312,421 | 1/1982 | Pioch | 56/320.1 X |
| 4,711,077 | 12/1987 | Kutsukake et al. | 56/320.2 |

Primary Examiner—George A. Suchfield
Attorney, Agent, or Firm—Harness, Dickey & Pierce

[57] ABSTRACT

A deck for a rotary lawn mower is disclosed which is designed to be fabricated from a polymeric composition by a blow mold process thereby forming double walls. The cavity between the double walls is filled with a suitable foam for added rigidity and sound absorption. The deck includes a support for an engine which defines an opening in the deck for the output shaft of the engine to extend through to the bottom of the mower, a tunnel for directing the grass clippings having a discharge opening for the clippings, and mounting platforms for the mower wheels and handle are integrally formed therewith in a single forming operation.

8 Claims, 2 Drawing Sheets

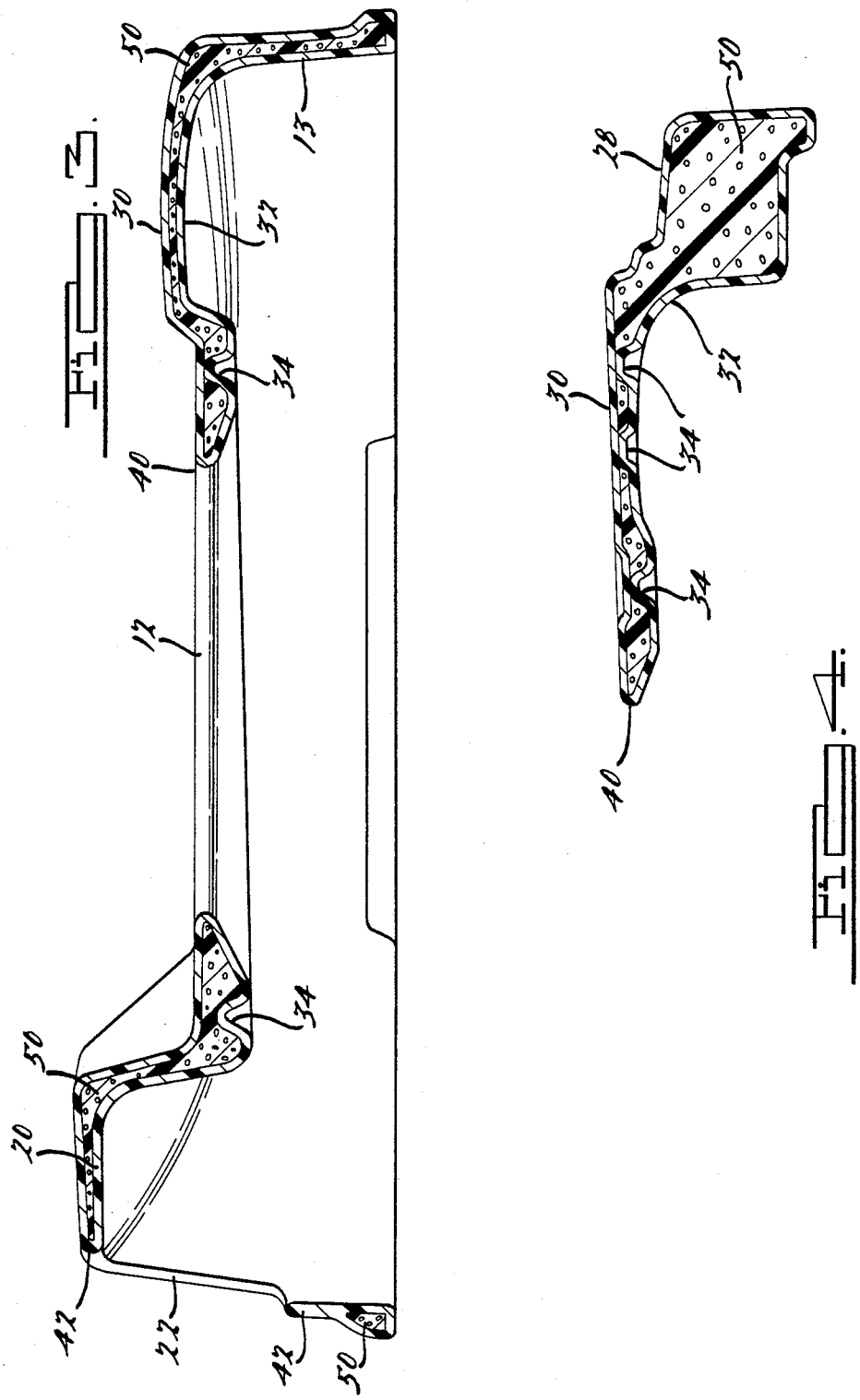

MOWER DECK CONSTRUCTION AND METHOD FOR MAKING SAME

BACKGROUND AND SUMMARY OF THE INVENTION

This invention relates generally to rotary lawnmower decks and more specifically to a rotary mower deck constructed of double wall of molded polymeric materials.

In conventional rotary lawnmowers, the mower deck generally serves as a frame for the mower with the engine, handle, wheels and other accessories being attached to various portions thereof. Such decks typically include an upper mounting surface to which the engine is mounted. The output shaft of the engine extends through a central opening in the deck so as to enable the mower blade to be operatively secured thereto. The deck normally incorporates a shroud covering the rotating blade which serves to both restrict access to the blade and also to direct the flow of grass clippings to a discharge opening in the side of the deck. A protective shield or a grass catcher can be attached to the deck, covering the discharge opening.

Heretofore, such mower decks have been fabricated from metal such as by various stamping or casting techniques. In some cases the deck is formed from a multiplicity of pieces which must thereafter be secured together such as by welding. These decks are generally heavy and may require several stamping or machining operations to complete. As a result, these mower decks are relatively expensive to produce. Further, the use of metal results in increased overall weight for the mower thus requiring greater effort to be expended in operation thereof.

The mower deck of the present invention overcomes these disadvantages of the prior construction. The mower deck of the present invention is specifically designed to be fabricated as an integral one piece unit from a polymeric composition which offers advantages of light weight and low cost fabrication while maintaining the ruggedness and durability achieved with prior metal mower decks.

The mower deck of the present invention is constructed of double walls of high density polyethylene by means of a blow molding process. At the edges of the deck, the center opening and discharge opening, the double walls are joined together during the forming process. In addition, at several other locations, the double walls are joined together so as to increase the rigidity of the resulting structure. Where not molded together, a cavity is formed between the double walls by the blow molding operation. The cavity between the walls is filled with a pour in place polyurethane foam which bonds to the wall of the cavity. This foam further increases the rigidity of the deck as well as provides increased sound absorption. Additionally, because of the versatility of the molding process, it is possible to simultaneously integrally form the necessary structures for mounting of the engine, wheels, handle and other accessories which may be secured to the mower deck in a conventional manner.

Further objects, features and advantages of the invention will become apparent from a consideration of the following description and the appended claims when taken in connection with the accompanying drawings.

BRIEF DESCRIPTION OF THE DRAWINGS

FIG. 3 is a section view of the mower deck of FIG. 1, the section being taken along the line 3—3 in FIG. 1; and FIG. 4 is a section view of a mower deck of FIG. 1, the section being taken along line 4—4 in FIG. 1.

DETAILED DESCRIPTION OF THE DRAWINGS

Figure 1:
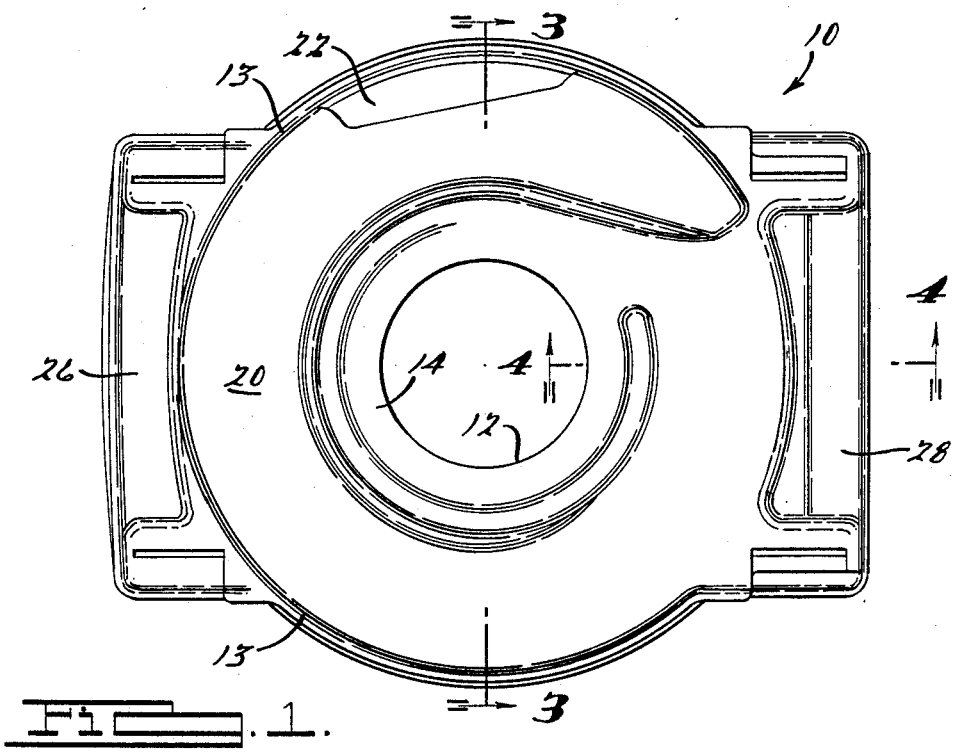
FIG. 1 is a plan view of a mower deck in accordance with the present invention.
Figure 2:
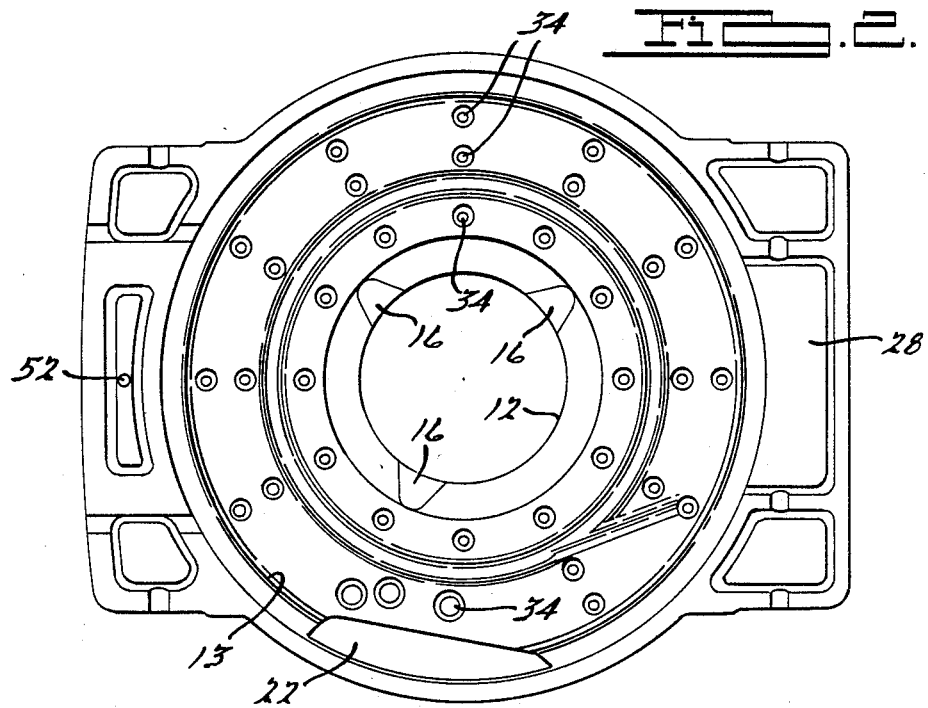
FIG. 2 is a bottom view of a mower deck in accordance with the present invention.

Now referring to the drawings, FIG. 1 shows a plan view of the mower deck according to this invention generally at 10. The mower deck defines a central opening 12 above which the mower engine or motor is mounted with its output shaft extending downward through opening 12. The engine or motor rests on upper surface 14 which forms a support around the periphery of the opening 12. An annular raised tunnel portion 20 is spaced radially outwardly from the opening 12 and includes an outer peripheral depending flange portion 13 together defining a passage through which the grass clippings are circulated to an opening 22 in flange portion 13 through which the grass clippings are discharged. Platform section 26, at the front of the mower, provides a mounting platform for securing the front wheels whereas platform section 28, at the rear of the mower, serves as a mounting platform for the rear wheels as well as incorporating means for securing the mower handle. As best seen with reference to FIGS. 2 and 3, suitably positioned flat bosses 16 are provided circumferentially spaced around opening 12 of deck 10 which are designed to accommodate mounting bolts for securing the engine thereto. Additionally, as seen in FIG. 3, mower deck 10 comprises upper and lower walls 30 and 32 which are joined together around the periphery of openings 22 and 12, the lower edge of peripheral flange 13 as well as at a plurality of spaced dimple portions 34. As best seen in FIGS. 2 and 4, various reinforcing ribs are provided as needed particularly in the area of platforms 26 and 28 which are of very similar construction and must be able to withstand the stresses from the supporting wheels and associate axles. The number and positioning of dimple portions 34 as well as the position and sizing of the various reinforcing ribs provided in respective platform sections 26 and 28 will be selected so as to impart the required rigidity to the resulting structure.

As shown, mower deck 10 is specifically designed to be integrally formed as a one piece structure from a suitable polymeric composition such as preferably a high density polyethylene material by means of a blow molding operation. In order to thus form mower deck 10, granules or pellets of the high density polyethylene is extruded to form a hollow, generally cylindrical ribbon. This ribbon is then encased between a pair of suitably contoured heated blow molding dies with one die half having the desired contour to form the top of the deck and the other die half having the desired contour to form the bottom of the deck. The die halves mold the double walls of polyethylene together at 40 around the center opening 12 and at 42 around the discharge opening 22. Air or a suitable pressurized gas is then blown into the mold between the double walls of the ribbon thereby forcing the polyethylene against the mold dies to form the outer contour of the deck. In so doing, a cavity is formed between the walls where they are not joined together. Once the forming operation is complete, the dies are opened and the thus formed mower deck is removed.

Thereafter, the cavity is filled with a suitable lightweight filling such as a polyurethane foam. Preferably, the polyurethane foam will be of a type which will adhere or bond to the polyethylene material used to form the mower deck. The foam is injected into the cavity through opening 52 in the bottom of the mower deck and will expand to substantially completely fill the cavity. Once the foam has cured it will become relatively rigid and because it also bonds to the inner surface of the walls refining the cavity, it will serve to substantially increase the rigidity and strength of the resulting mower deck. Additionally, the use of this foam filling will also dampen operational noise producing vibrations thus serving to reduce the overall noise level produced by the mower.

The use of a high density polyethylene has several advantages in that it is readily available and relatively inexpensive making its use cost effective. In addition, it is easily blow molded, has good impact strength and is relatively rigid. The resulting mower deck 10 formed from these materials in accordance with the present invention is substantially in weight thus making it easier to push across lawns when in use as well as offering savings in shipping costs. Additionally, the use of such materials eliminates the potential problems of corrosion from grass accumulation and the like. It should be noted that while a specific structural configuration has been illustrated and described above for mower deck 10, the various contours and openings therein may be easily and conveniently adapted for a wide variety of other style mower decks which may be formed in accordance with the concepts disclosed herein.

It is to be understood that the invention is not limited to the exact construction or method illustrated and described above, but that various changes and modifications may be made without departing from the spirit and scope of the invention as defined in the following claims.

What is claimed is:

1. A deck for use in a rotary lawnmower comprising:
   first and second walls of a polymeric material blow molded together to form the top and bottom respectively of said deck, portions of said walls spaced apart from each other to form a cavity between said layers;
   a foam material filling said cavity; and
   said deck having an annular mounting surface on the top of said deck for supporting motor means, said mounting surface defining an opening for the output shaft of said motor means to extend through to the bottom of said deck.

2. The deck of claim 1 wherein said polymeric material is a high density polyethylene.

3. The deck of claim 1 wherein said foam material is polyurethane.

4. The deck of claim 3 wherein said polyurethane foam is injected as a liquid into said cavity through an opening in one of said layers.

5. The deck of claim 1 further comprising dimples in one of said walls where said first and second walls are molded together.

6. A deck for use in a rotary lawnmower comprising:
   first and second walls of polymeric material blow molded together to form the top and bottom respectively of said deck, portions of said walls spaced apart from each other to form a cavity between said layers;
   a foam material filling said cavity;
   a deck having an annular mounting surface on the top of said deck for supporting motor means, said mounting surface defining an opening for the output shaft of said motor means to extend through to the bottom of said deck; and
   said mower deck further having a tunnel portion for directing the flow of grass clippings and an opening for discharge of said clippings from said tunnel therethrough, a first platform means for mounting front wheels thereon, and a second platform means for mounting rear wheels and a handle thereto.

7. A mower deck for use in a rotary lawnmower comprising:
   a first wall having a contour to define a first surface of said mower deck;
   a second wall having a contour to define a second surface of said mower deck, said second surface facing a direction opposite that of said first surface and portions of said second wall being spaced from said first wall to define a cavity therebetween;
   rigidifying sound deadening means substantially filling said cavity; and
   means integrally formed on at least one of said first and second walls for enabling supporting wheels, power means and handle means to be secured thereto.

8. A mower deck for use in a rotary lawn mower comprising:
   an integrally formed one piece housing, said housing including
   a first wall having a contour to define a first surface of said mower deck;
   a second wall having a contour to define a second surface of mower deck, said second surface facing a direction opposite that of said first surface and portions of said second wall being spaced from said first wall to define a cavity therebetween; and
   means integrally formed on at least one of said first and second walls for enabling supporting wheels, power means and handle means to be secured thereto externally of said cavity.

* * * * *

UNITED STATES PATENT AND TRADEMARK OFFICE
CERTIFICATE OF CORRECTION

PATENT NO. : 4,899,526

DATED : February 13, 1990

INVENTOR(S) : Jack E. Harris

It is certified that error appears in the above-identified patent and that said Letters Patent is hereby corrected as shown below:

Column 2, line 14, "Drawings" should be --Preferred Embodiment--.

Column 3, line 28, after "substantially" insert --light--.

Signed and Sealed this

Twenty-sixth Day of March, 1991

Attest:

HARRY F. MANBECK, JR.

*Attesting Officer*     *Commissioner of Patents and Trademarks*